(12) United States Patent
Snelten et al.

(10) Patent No.: US 9,718,605 B2
(45) Date of Patent: Aug. 1, 2017

(54) CONTAINER FOR CONTAINING A LIVING ORGANISM, A DOCKING STATION AND A TRANSPORTATION SYSTEM

(75) Inventors: Jeroen Snelten, Eindhoven (NL); Denis Joseph Carel Van Oers, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 1399 days.

(21) Appl. No.: 12/865,449

(22) PCT Filed: Jan. 29, 2009

(86) PCT No.: PCT/IB2009/050360
§ 371 (c)(1),
(2), (4) Date: Jul. 30, 2010

(87) PCT Pub. No.: WO2009/098617
PCT Pub. Date: Aug. 13, 2009

(65) Prior Publication Data
US 2011/0000807 A1    Jan. 6, 2011

(30) Foreign Application Priority Data

Feb. 6, 2008  (EP) .................................... 08151091

(51) Int. Cl.
*A01G 7/04*   (2006.01)
*A01G 9/26*   (2006.01)
*A01G 9/20*   (2006.01)
*B65D 85/50*  (2006.01)
*A01G 9/16*   (2006.01)
(Continued)

(52) U.S. Cl.
CPC ............... *B65D 85/50* (2013.01); *A01G 9/16* (2013.01); *A01K 1/0236* (2013.01); *B65D 85/52* (2013.01)

(58) Field of Classification Search
CPC .......... A01G 7/045; A01G 7/04; A01G 31/06; A01G 31/02
USPC .............. 47/1.4, 59 R, 62 R, 63, 39, 58.1 R, 47/58.11 S, 1.7
See application file for complete search history.

(56) References Cited

U.S. PATENT DOCUMENTS 3,233,146 A * 2/1966 Vacha .............................. 315/97
3,529,379 A * 9/1970 Ware ................................ 47/17
4,255,897 A * 3/1981 Ruthner ........................... 47/65
(Continued)

FOREIGN PATENT DOCUMENTS

DE  202004007633 U1  7/2004
EP        1300066 A1  4/2003
(Continued)

*Primary Examiner* — Monica Williams

(57) ABSTRACT

The invention relates to a container for containing a living organism, a docking station for docking the container, and a transportation system comprising the container and the docking station. The container comprises a docking for docking the container to a docking station. The docking station comprises a light emitter. The container comprises light-guiding means for guiding at least part of the light emitted by the light emitter to the living organism. The effect of the measures according to the invention is that the light required for illuminating the living organism is generated by the light emitter of the docking station. As a result, no light emitters are necessary in the container according to the invention which reduces the cost of the container.

15 Claims, 1 Drawing Sheet

(51) Int. Cl.
*A01K 1/02* (2006.01)
*B65D 85/52* (2006.01)

(56) References Cited

U.S. PATENT DOCUMENTS

| | | | |
|---|---|---|---|
| 4,396,872 A * | 8/1983 | Nutter | 315/308 |
| 4,513,531 A * | 4/1985 | Lestraden | 47/39 |
| 5,321,907 A | 6/1994 | Ueno et al. | |
| 6,312,139 B1 * | 11/2001 | Baker et al. | 362/145 |
| 6,554,450 B2 * | 4/2003 | Fang et al. | 362/231 |
| 6,725,598 B2 * | 4/2004 | Yoneda et al. | 47/60 |
| 6,921,182 B2 | 7/2005 | Anderson, Jr. et al. | |
| 6,947,810 B2 * | 9/2005 | Skinner | 700/283 |
| 7,033,060 B2 | 4/2006 | Dubuc | |
| 7,160,717 B2 * | 1/2007 | Everett | 435/286.2 |
| 7,600,642 B2 * | 10/2009 | Deppermann | 209/552 |
| 2003/0059932 A1 * | 3/2003 | Craigie et al. | 435/292.1 |
| 2005/0076563 A1 * | 4/2005 | Faris | 47/58.1 LS |
| 2007/0188427 A1 | 8/2007 | Lys et al. | |
| 2007/0215890 A1 | 9/2007 | Harbers et al. | |
| 2009/0000188 A1 * | 1/2009 | Sayers et al. | 47/58.1 R |
| 2010/0031564 A1 * | 2/2010 | Loebl et al. | 47/39 |

FOREIGN PATENT DOCUMENTS

| | | |
|---|---|---|
| JP | 2000106757 A | 4/2000 |
| WO | 2007093607 A1 | 8/2007 |
| WO | WO 2008047275 A1 * | 4/2008 |

* cited by examiner

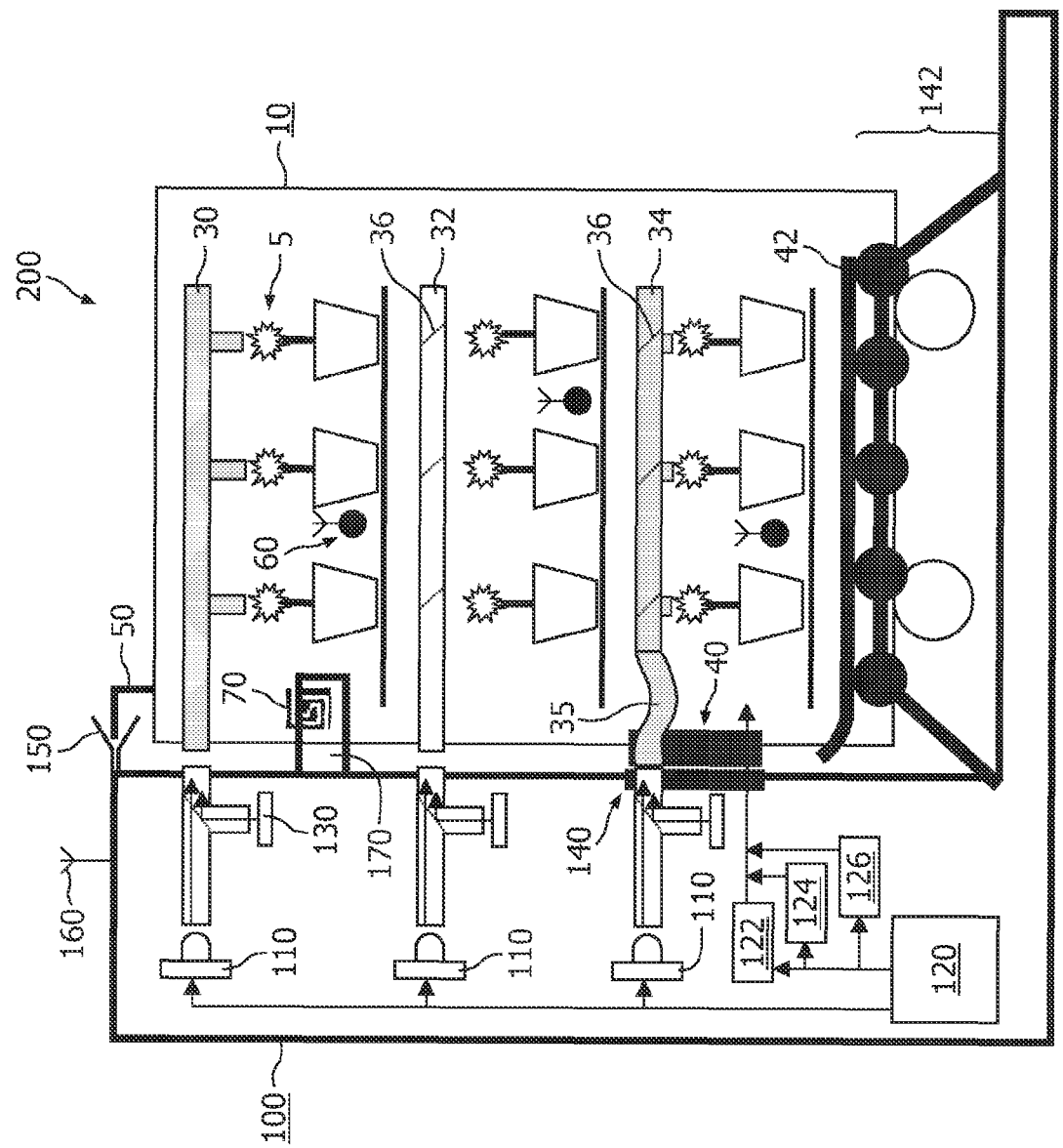

CONTAINER FOR CONTAINING A LIVING ORGANISM, A DOCKING STATION AND A TRANSPORTATION SYSTEM

FIELD OF THE INVENTION

The invention relates to a container for containing a living organism.

The invention also relates to a docking station for docking the container and to a transportation system comprising the container and the docking station.

BACKGROUND OF THE INVENTION

Containers are known per se. They are used, inter alia, for shipping large quantities of cargo across the seas and for transportation cargo by truck. Containers are also known as temporary habitats or working environment, also known as portacabins. Containers for containing and transportation living organisms are also known. Such containers may, for example, be used for shipping relatively large mammals such as horses, or for storing and/or transportation of horticultural plants.

Such a container is, for example, known from the U.S. Pat. No. 5,321,907. In this patent application a method for storing horticultural plants and an apparatus therefore are disclosed. The known method comprises placing the live horticultural plants in a container for transportation, wherein the temperature and the humidity in the container are kept at conditions suited for the horticultural plants. Volatile gas generated by the horticultural plants is removed, the air inside the container is circulated, and the horticultural plants are irradiated with a light mainly composed of red light and blue light. The known apparatus comprises a container for storing the horticultural plants. The known container comprises a temperature controller for controlling the temperature in the container, a humidity controller for controlling the humidity in the container, a volatile gas absorber for absorbing volatile gas in the container, a wind-blower for circulating air in the container, and a light irradiator for irradiating a light mainly composed of red light and blue light.

A disadvantage of the known lighting system is that the known container is relatively expensive.

SUMMARY OF THE INVENTION

It is an object of the invention to provide a container having reduced cost.

According to a first aspect of the invention the object is achieved with a container comprising docking means for docking the container to a docking station comprising a light emitter, the container further comprising light-guiding means for guiding at least part of the light emitted by the light emitter to the living organism.

An effect of the container according to the invention is that the light required for illuminating the living organism is generated by the light emitter of the docking station. As a result, no light emitters are necessary in the container according to the invention which reduces the cost of the container. When the container is transported, it may be docked in the docking station which provides the light via the light emitter for illuminating the living organism.

The known containers include an illumination system for illuminating the living organism. This known illumination system typically comprises a light source and a controller for controlling the light source and thus is relatively expensive. The known illumination system inside the container is idle for a relatively long time, for example, when the known container is waiting to be loaded with a new freight of living organisms, such as horticultural plants. This idle time may be relatively long and during this idle time of the known container, the investment for the known illumination system is not optimally used. In the container according to the invention, the light emitter for illuminating the living organisms is part of the docking station. In such an arrangement, the container according to the invention may only comprise light-guiding means which, when docked in a docking station provide at least part of the light emitted by the light emitter to the living organism. The cost of the container according to the invention is reduced substantially due to the fact that the container according to the invention only comprises the light-guiding means and does not contain the light emitter and optional controlling electronics. The container according to the invention is preferably transported in the docking station which comprises the light emitter for illuminating the living organisms. As a result, the cost of the containers is reduced while providing the required illumination of the living organisms during transport.

Living organisms may, for example, be horticultural plants, or animals such as horses. The container according to the invention is especially beneficial when the living organisms have to travel relatively long.

Cultivation of horticultural plants is gradually moved to countries in which the wages are relatively low. The containers which are loaded and off-loaded in these countries should preferably be relatively low-cost and robust and should preferably not comprise complex and expensive electronics. The container according to the invention comprises light-guiding means for guiding at least part of the light emitted by the light emitter of the docking station to the living organism. As such, the container does not contain the light emitters and the optional lighting electronics for controlling the light emitters which reduces electronics and thus the cost of the container. During transport, the container according to the invention is preferably transported in the docking station which comprises the light emitter for illuminating the living organisms in the container. So when the horticultural plants are transported, the light emitter of the docking station provides the illumination which enables the horticultural plants to grow during transport. Especially when the transport is done over sea, the time required for the transport is considerable. Using the light emitter from the docking station the horticultural plants may grow during the transport and arrive at their destination further matured and strengthened while using relatively cheap containers for transport.

A further benefit of the container according to the invention is that the container according to the invention has reduced maintenance costs such as cleaning and/or calibration of the light sources. Furthermore, the container is less sensitive to defects, for example, defects in the electronics for driving the light source. As the electronics for driving the light source are typically included in the docking station, the docking station may be designed for easier defect management.

In an embodiment of the container, the light-guiding means comprises a reflective element and/or an optical wave-guide and/or a flexible fiber and/or a hollow tube. The reflective element may, for example, be a mirror or a dielectric layer being fully or partially reflective. The optical wave-guide may, for example, comprise a solid light conductor constituted of poly-methyl-meta-acrylate, further also indicated as PMMA. A benefit of the use of the reflective element and/or optical wave-guide and/or flexible fiber and/or hollow tube is that these light-guiding means are relatively robust.

In an embodiment of the container, the docking means are selected from the group comprising: outer dimensions of the container, rail system, connector and alignment means. When the docking means are, for example, a rail system, the container may comprise a rail or ledge which is rolled on to wheels on the docking station. This embodiment is beneficial when the height of the container in the docking station is critical, for example, for enabling a coupling between the light emitter and the light-guiding means. The docking means may also be a connector which, for example, comprises an optical fiber to enable the coupling between the light emitter and the light-guiding means of the container. The connector may be a plug attached to the container which fits a socket in the docking station, or may be a socket attached to the container which fits a plug of the docking station.

In an embodiment of the container, the container comprises alignment means for aligning the light-guiding means of the container to the light emitter of the docking station for coupling at least part of the light emitted by the light emitter into the light-guiding means. A benefit of this embodiment is that the positioning between the container and the docking station is less critical as the coupling between the light-guiding means and the light emitter may be achieved using the alignment means of the container. Alternatively, the docking station may comprise the alignment means for aligning the light emitter to the light-guiding means of the container.

In an embodiment of the container, the container comprises a sensor for sensing a biological state of the living organism, and/or for sensing a temperature in the container, and/or for sensing a moisture-level in the container, and/or for sensing an illumination level in the container, and/or for sensing a level of carbon dioxide in the container, and/or for sensing a level of nutrients in the container, and/or for sensing a level of pesticides and/or fungicides in the container. The sensor or a plurality of sensors of the container may provide the sensed information to a controller, for example, located in the docking station. This controller may determine whether or not the current conditions with respect to, for example, illumination level, temperature, moisture, etc. are adequate for the living organism which is contained in the container. If the sensed level deviates from the required level, the controller may intervene and may be arranged to adapt the illumination level, temperature, moisture level, etc. The sensor may in addition be used as a feedback control to indicate the effect of a variation of, for example, the color and/or intensity of the light emitted by the light emitter near the living organism. This may be beneficial, because the efficiency of the coupling between the light emitter and the light-guiding means may not always be the same. Sensing what the effect of a variation of the color and/or intensity near the living organism is may enable to estimate the efficiency of the coupling between the light emitter and the light-guiding means, ensuring that the required amount and color of light impinges on and/or near the living organism. Especially with horticultural plants making a relatively long journey, it is important for the well-being of the plants and to ensure the commercial value of the plants is maintained that the required amount of light impinges on the plants and that the predetermined sequence of colors and/or intensities is used.

According to a second aspect of the invention the object is achieved with a docking station for docking a container for containing a living organism, the docking station comprising complementary docking means for cooperating with docking means of the container for docking the container to the docking station, the docking station comprising a light emitter being configured for coupling at least part of the light emitted by the light emitter into a light-guiding means of the container when docked in the docking station.

In an embodiment of the docking station, the light emitter is configured for altering a spectrum and/or intensity of the light emitted by the light emitter. A benefit of this embodiment is that the light emitter may, for example, emulate the spectrum and/or intensity of the light emitted by the sun such that the living organism maintains its natural circadian rhythm. Alternatively, the color and/or intensity of the light emitted by the light emitter may be chosen to obtain a specific effect, for example, improve the growth conditions for the horticultural plants or to reduce the growth of the horticultural plants to generate some kind of rest-state such that the plants during transport consume only little energy. For example, reducing the amount of blue light reduces the growing speed of plants.

In an embodiment of the docking station, the docking station comprises a controller for controlling the intensity and/or spectrum of the light emitted by the light emitter. A benefit of this embodiment is that the controller may choose the optimum intensity and/or spectrum to achieve a predetermined effect. For example, when animals are transported across the ocean, the controller may gradually change the day/night rhythm such that the animal can already adapt to the day/night rhythm at its destination. The controller may, for example, use another signal, for example, from the sensor of the container to control the effect of the spectrum and/or intensity on the living organism and adapt the spectrum and/or intensity based on the signal from the sensor.

In an embodiment of the docking station, the docking station comprises an inspection camera configured for being connected to the light-guiding means of the container for inspecting the living organism. A benefit of this embodiment is that the quality of the living organism may be visually inspected by an operator. Furthermore, the inspection camera may also be used to sense other parameters of the living organism. When, for example, the container comprises a plurality of living organisms, for example, a plurality of plants, a single inspection camera may sequentially be connected to inspect the different plants from the plurality of plants and may be used, for example, to provide an indication of the growth-speed of the individual plants. If, for example, a subgroup of plants is growing at a different speed, this information may be provided to the controller to, for example, locally adapt the conditions of the plurality of plants such that substantially all plants have similar growth speed.

According to a third aspect of the invention the object is achieved with a transportation system for transportation a living organism, the transportation system comprising the container and the docking system.

In an embodiment of the transportation system, alignment means of the container are configured for cooperating with complementary alignment means of the docking station. By using both the alignment means and the complementary alignment means a relatively accurate alignment of the container to the docking station may be achieved allowing a relatively high efficiency in the coupling of the light from the light emitter into the light-guiding means.

In an embodiment of the transportation system, the container comprises a connector connectable to a complementary connector of the docking station for coupling the container to the docking station, the connector and the complementary connector being configured for providing conditioned air to the container. The conditioned air may have a predefined humidity and/or temperature to achieve a predetermined effect. Using the conditioned air, for example, a winter-rest period may be simulated such that at the end of the journey the plants will start a blooming cycle. As such, the commercial value of the plants has increased during transport.

The connector and the complementary connector may be configured for providing nutrients to the container. When the container comprises a plurality of living organisms, for example, a plurality of plants, the providing of nutrients may be regulated such that the amount of nutrients provided to each plant may be controllable. In such an embodiment the controller of the docking station may regulate the conditions of each of the plants individually, optimizing the conditions for each plant individually.

The connector and the complementary connector may be configured for providing water to the container. Again, when the container comprises a plurality of living organisms the providing of water may be regulated such that the amount of water provided is controllable for each living organism. Again optimizing conditions for each organism individually.

The connector and the complementary connector may be configured for providing pesticides and/or fungicides to the container. The use of pesticides and/or fungicides should be reduced as much as possible because generally pesticides and/or fungicides are bad for the environment and because the people loading and off-loading the container should only be exposed to as little pesticides and/or fungicides as possible. The amount of pesticides and/or fungicides and where to apply the pesticides and/or fungicides inside the container may be determined relatively accurately such that the overall amount of pesticides and/or fungicides used should be as low as possible.

The connector and the complementary connector may be configured for providing carbon dioxide to the container. It has been proven that an excess of carbon dioxide has an improved effect on the growing speed of plants. Such an excess of carbon dioxide may be provided to the container via the connector and the complementary connector.

The connector and the complementary connector may be configured for providing a sense-signal from the sensor to the docking station. The sense signal may include several parallel or sequential sense signals representing, for example, the biological state of the living organism, and/or the temperature inside the container and/or near the living organism, and/or the moisture-level in the container or near the living organism, and/or the illumination level in the container or near the living organism, and/or the level of carbon dioxide in the container, and/or the level of pesticides and/or fungicides in the container. This information may be used by the controller to generate a feed-back control sequence in which the effect of a change in, for example, temperature, nutrients, water, light, carbon dioxide, pesticides and/or fungicides is controlled using the sense signal from the sensor to the docking station as a feed-back signal.

In an embodiment of the transportation system, the container comprises an identification tag and wherein the docking station comprises an identification unit for reading the identification tag to identify the container. Recognizing a specific identification tag by the identification unit may trigger a specific predefined control sequence in the controller of the docking station. For example, the identification tag may indicate that the plants in the container are orchids requiring a specific illumination sequence, temperature and humidity. After recognizing the identification tag, the controller will start to control the illumination, temperature and humidity inside the container such that the environment inside the container substantially complies with the requirements predefined for orchids. A further identification tag may indicate that the plants in the container are roses which need to have a winter-simulation program during their journey. The controller will recognize the identification tag and will initiate the winter-simulation program such that, for example, at the end of the journey the roses will start blooming, thus increasing the commercial value of the plants during their journey. The identification tag may be a wireless tag cooperating with a wireless identification unit. Alternatively, the identification tag may be a mechanical key, or an electronic key, or a code-word or pass-word, each cooperating with an appropriate identification unit. The identification tag may also include programming information or a program for programming the controller to perform the specific predefined control sequence.

BRIEF DESCRIPTION OF THE DRAWINGS

These and other aspects of the invention are apparent from and will be elucidated with reference to the embodiments described hereinafter.

In the drawings:

FIG. 1 shows a schematic overview of a transportation system according to the invention comprising a container and a docking station for docking the container.

The FIGURE is purely diagrammatic and not drawn to scale. Particularly for clarity, some dimensions are exaggerated strongly. Similar components in the FIGURE are denoted by the same reference numerals as much as possible.

DETAILED DESCRIPTION OF EMBODIMENTS

FIG. 1 shows a schematic overview of a transportation system 200 according to the invention comprising a container 10 and a docking station 100 for docking the container 10. The docking station 100 is configured for docking the container 10 and comprises a light emitter 110. The container 10 is configured for containing living organisms 5, for example, plants 5 as shown in FIG. 1. The container 10 further comprises light-guiding means 30, 32, 34, 36 for guiding at least part of the light emitted by the light emitter 110 to the living organism 5. The light-guiding means may, for example, comprise a reflective element 36 and/or an optical wave-guide 30, 32, 34. The reflective element 36 may, for example, be a mirror 36 or a dielectric layer 36 applied on a carrier plate (not shown). Such a reflective element 36 may be substantially fully or partially reflective. The optical wave-guide 30, 32, 34 may, for example, comprise a solid light conductor 30, 34 constituted of PMMA, or may comprise a hollow tube 32 for guiding at least part of the light emitted by the light emitter 110. The hollow tube 32 may, for example, comprise semi-transparent mirrors 36 for redirecting part of the guided light to one of the living organisms 5, while the remainder of the light continues through the hollow tube to a further living organism 5. The use of the light-guiding means 30, 32, 34, 36 causes the container 10 to be relatively robust. The container 10 may further comprise docking means 40, 42. These docking means 40, 42 may, for example, be mechanical docking means 40, 42 such as a rail system 42 for docking the container 10 to the docking station 100. Alternatively, the docking means 40, 42 may be constituted of a connector 40 of the container 10 which may be connected to a complementary connector 140 of the docking station 100. The connector 40 may, for example, comprise a flexible optical guide 35 or a flexible fiber 35 for enabling the connector 40 to be connected to the complementary connector 140 even when the height of the container 10 with respect to the docking station 100 is not optimal. Alternatively (not shown), the flexible optical guide or fiber may be part of the complementary connector 140. The coupling between the docking station 100 and the container 10 via a connector 40 and a complementary connector 140 further enables the docking station 100 to provide additional supplies to the container 10, such as conditioned air from an air-conditioning unit 122, water from a water supply 124, nutrients from a nutrients supply 126. To control the light emitted by the light emitter 110, and to control the air-conditioning unit 122, the water supply 124 and the nutrients supply 126 the docking station 100 comprises a controller 120. The controller 120 may, for example, control an intensity and/or spectrum of the light emitted by the light emitter 110. The controller 110 may, for example, choose the optimum intensity and/or spectrum to achieve a predetermined effect. For example, when animals are transported across the ocean, the controller 110 may gradually change the day/night rhythm such that the animal can already adapt to the day/night rhythm at its destination. The controller 110 may, for example, use a signal from the sensor 60 of the container 10 to control the effect of the spectrum and/or intensity on the living organism 5 and adapt the spectrum and/or intensity based on the signal from the sensor 60.

The coupling between the docking station 100 and the container 10 may also be used to exchange a sense-signal (not shown) from a sensor 60 inside the container to the docking station 100. The container comprises a sensor 60, which, in the embodiment shown in FIG. 1 is illustrated as a wireless sensor 60. The sensor 60 may be configured to sense a biological state of the living organism 5, and/or to sense a temperature in the container 10, and/or to sense a moisture-level in the container 10, and/or to sense an illumination level in the container 10, and/or to sense a level of carbon dioxide in the container 10, and/or to sense a level of nutrients in the container 10, and/or for sensing a level of pesticides and/or fungicides in the container 10. When a plurality of sensors 60 are used, the plurality of sensors 60 may provide information about the biological state of individual living organisms 5 in a plurality of living organisms, may provide information about the temperature at different locations in the container, may provide information about the distribution of moisture, nutrients, pesticides and/or fungicides in the container 10. This enables the controller to adapt the conditions throughout the container 10 such that each plant 5, for example, comprises optimal growth conditions.

The wireless sensor 60 may wireless be connected to an antenna 160 which provides the information sensed by the sensor 60 to the controller 120 of the docking station 100. Alternatively, the sensor 60 may be connected to the controller 120 via a wire (not shown) through the connector 40 and the complementary connector 140.

The docking means 40, 42 may, for example, be a rail system 42. In such an embodiment, the container may comprise a rail 42 or ledge 42 which is connected, for example, at a side-wall (not indicated) of the container 10. The docking station 100 may comprise, for example, complementary docking means 142 which, for example, comprise a plurality of wheels 143 on which support the rail 42 and which enable the container 10 to be moved relatively accurately onto the docking station 100, for example, such that the light-guiding means 30, 32, 34, 36 are positioned with respect to the light emitters 110 such that at least part of the light emitted by the light emitter 100 is guided by the light-guiding means 110 to the living organisms 5.

The light emitter 110 of the docking station 100 may be configured for altering a spectrum and/or intensity of the light emitted by the light emitter 110. The light emitter 110 may, for example, be constituted of a plurality of light sources (not shown) which emit, for example, a different color of light. By altering the intensity of the different light sources of the plurality of light sources, the color of the light emitted by the light emitter 110 may be influence. The light emitter 110 preferably comprises light emitting diodes as a light source because light emitting diodes are relatively robust and have a relatively long lifetime. However, also other light sources may be used as light emitter 110, for example, high pressure discharge lamps, low pressure discharge lamps, incandescent lamps and/or halogen lamps. By altering the intensity and/or color of the light emitted by the light emitter 110, the light emitter 110 may, for example, emulate the spectrum and/or intensity variation of the light emitted by the sun such that the living organism 5 maintains its natural circadian rhythm. Alternatively, the color and/or intensity of the light emitted by the light emitter 110 may be chosen to obtain a specific effect, for example, improve the growth conditions for the horticultural plants 5 or, alternatively, to reduce the growth of the horticultural plants 5 to generate some kind of rest-state such that the plants during transport consume only little energy. The controller 120 may be used to automate the color and/or intensity variation of the light emitted by the light emitter 110.

The docking station 100 may further comprise an inspection camera 130 for inspecting the living organism 5. The inspection camera 130 may, for example, be connected to the light-guiding means 30, 32, 34, 36 of the container 10. The inspection camera 130 may be used to visually inspect the living organisms 5 by an operator. Furthermore, the inspection camera may also be used to sense other parameters of the living organism 5. For example, a single inspection camera 130 may sequentially be connected to inspect different plants 5 from a plurality of plants 5 and may be used, for example, to provide an indication of the growth-speed of the individual plants 5. If, for example, a subgroup of plants 5 is growing at a different speed, this information may be provided to the controller 120 to, for example, locally adapt the conditions of the plants 5 such that substantially all plants 5 have similar growth speed. Alternatively, the inspection camera may inspect the living organism 5 in a different manner that via the light-guiding means 30, 32, 34, 36, for example, via a window in the container 10 which may be aligned with the position of the inspection camera of the docking station 100.

In the transportation system 200 according to the invention, alignment means 50 of the container 10 may be configured for cooperating with complementary alignment means 150 of the docking station 100. In the embodiment shown in FIG. 1, the alignment means 50 and the complementary alignment means 150 are configured for mechanically align the container 10 with respect to the docking station 100. Using mechanical alignment means 50, 150 generally limits the accuracy of the alignment between the container 10 and the docking station 100. Still, the mechanical alignment means 50, 150 are relatively cheap and may be sufficiently accurate to enable coupling part of the light emitted by the light emitter 110 into the light-guiding means 30, 32, 34, 36 of the container 10. The mechanical alignment means 50, 150 as shown in FIG. 1 comprise of a pin-shaped alignment means 50 connected to the container 10 and a cone-shaped complementary alignment means 150 connected to the docking station 100. By using both the alignment means 50 and the complementary alignment means 150 a relatively accurate alignment of the container 10 to the docking station 100 may be achieved allowing a relatively high efficiency of the coupling of the light from the light emitter 110 into the light-guiding means 30, 32, 34, 36. Alternatively, other alignment means 50 and complementary alignment means 150 may be used to align the position of the container 10 with respect to the docking station 100.

In the transportation system 200 according to the invention, the container 10 comprises an identification tag 70 and the docking station 100 comprises an identification unit 170 for reading the identification tag 70. Using the identification tag 70 and the identification unit 170 the container 10 may be identified by the docking station 100 which may be used to, for example, trigger a specific predefined control sequence in the controller 120 of the docking station 100. Alternatively, the identification tag 70 may comprise, next to identification information, also the specific predefined control sequence which is required for the living organism 5 inside the container 10. For example, the identification tag 70 may indicate that the plants 5 in the container 10 are orchids requiring a specific illumination sequence, temperature and humidity. After recognizing the identification tag 70, the controller 120 will start to control the illumination, temperature and humidity inside the container 10 such that the environment inside the container 10 substantially complies with the requirements predefined for orchids. A further identification tag 70 may comprise a winter-simulation program which may, for example, be suited for roses inside the container 10. The controller 120 will read the winter-simulation program and will initiate the winter-simulation program such that, for example, at the end of the journey the roses will start blooming, thus increasing the commercial value of the plants 5 during their journey.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A transportation container and an external docking station for containing living organisms, comprising:
   the transportation container, wherein the transportation container is substantially enclosed and configured to contain the living organisms within the container;
   the external docking station having complementary docking means for docking the container to the external docking station, the external docking station including at least one light emitter, wherein the at least one light emitter is separate from and external to the transportation container, and wherein the transportation container does not contain the at least one light emitter,
   the transportation container separable from the docking station and having docking means, the docking station including the at least one light emitter and the transportation container including light guiding means within the container, wherein the light guiding means comprise a hollow tube having semi-transparent mirrors configured for redirecting the guided light to plurality of exit points in the hollow tube;
   wherein the light-guiding means is operable for guiding at least part of the light emitted by the light emitter to the living organisms, and wherein the at least one light emitter is located outside of the light-guiding means.

2. The transportation container and docking station as claimed in claim 1, wherein the docking means are selected from the group consisting of:
   rail system,
   connector, and
   alignment means.

3. The transportation container and docking station as claimed in claim 1, further comprising alignment means for aligning the light-guiding means of the transportation container to the light emitter of the docking station for coupling at least part of the light emitted by the light emitter into the light-guiding means.

4. The transportation container and docking station as claimed in claim 1, wherein the container comprises a sensor for sensing a biological state of the living organism, or for sensing a temperature in the transportation container, or for sensing a moisture-level in the container, or for sensing an illumination level in the transportation container, or for sensing a level of carbon dioxide in the container, or for sensing a level of nutrients in the container, or for sensing a level of pesticides or fungicides in the transportation container.

5. The transportation container and docking station as claimed in claim 1, the at least one light emitter configured for coupling at least part of the light emitted by the at least one light emitter into the light-guiding means of the transportation container when docked in the docking station.

6. The transportation container and docking station as claimed in claim 5, further comprising:
   an alignment means of the transportation container configured for cooperating with a complementary alignment means of the docking station.

7. The transportation container and docking station as claimed in claim 5, wherein the transportation container comprises a connector connectable to a complementary connector of the docking station for coupling the transportation container to the docking station, the connector and the complementary connector being configured for providing conditioned air to the transportation container, or for providing nutrients to the transportation container, or for providing water to the transportation container, or for providing pesticides and/or fungicides to the transportation container, or for providing carbon dioxide to the transportation container, or for providing a sense-signal from the sensor to the docking station.

8. The transportation container and docking station as claimed in claim 5, wherein the transportation container comprises an identification tag and wherein the docking station comprises an identification unit for reading the identification tag to identify the transportation container.

9. A transportation container for containing a living organism and docking with a docking station, the transportation container comprising:
a connector coupling the transportation container to an external docking station, wherein the external docking station is configured to include a plurality of light emitters separate from and external to the transportation container;
wherein the transportation container is separable from the external docking station using the connector on the container and a complementary connector on the docking station, wherein the transportation container is substantially enclosed and configured to contain the living organism within the container, and wherein the transportation container does not contain any light emitters;
light guides in the transportation container are configured to optically couple with the light emitters in the docking station, wherein the light guides comprise hollow tubes having semi-transparent mirrors configured for redirecting the guided light to plurality of exit points in the hollow tubes;
wherein the light guides guide at least part of the light emitted by the light emitters to the transportation container, and wherein the light emitters are located outside of the light guides.

10. The transportation container of claim 9 wherein the connector is a mechanical docking system facilitating docking of the transportation container to the docking station.

11. A transportation container for containing a living organism and docking with a docking station, comprising:
the transportation container, wherein the transportation container is substantially enclosed and configured to contain the living organism within the container;
a plurality of light emitters in the docking station separate from and external to the transportation container, and wherein the transportation container does not contain any light emitters;
an optical interface between the docking station and the container;
a mechanical interface between the docking station and the transportation container to allow the transportation container to be docked with the docking station;
light guides in the transportation container optically coupled with the plurality of light emitters in the docking station, wherein the light guides comprise hollow tubes having semi-transparent mirrors configured for redirecting the guided light to plurality of exit points in the hollow tubes;
wherein the light guides guide at least part of the light emitted by the light emitters to a plurality of differing locations in the transportation container, and wherein the light emitters are located outside of the light guides.

12. The transportation container of claim 11 wherein the mechanical interface is a mechanical docking system for docking the container to the docking station.

13. The transportation container of claim 12 wherein the mechanical docking system is a rail system.

14. The transportation container of claim 11 wherein optical interface is a connector of the container and a complementary connector on the docking station.

15. The transportation container of claim 14 wherein the connector also provides an air supply from the docking station to the transportation container.

* * * * *